United States Patent
Lien et al.

(10) Patent No.: US 12,541,311 B1
(45) Date of Patent: Feb. 3, 2026

(54) POWER MANAGEMENT FOR MEMORY DEVICES WITH PARTIALLY GOOD BLOCKS

(71) Applicant: Micron Technology, Inc., Boise, ID (US)

(72) Inventors: Yu-Chung Lien, San Jose, CA (US); Zhenming Zhou, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/951,530

(22) Filed: Nov. 18, 2024

(51) Int. Cl.
*G06F 3/06* (2006.01)

(52) U.S. Cl.
CPC ............ *G06F 3/0625* (2013.01); *G06F 3/064* (2013.01); *G06F 3/0679* (2013.01)

(58) Field of Classification Search
CPC ....... G06F 3/0625; G06F 3/064; G06F 3/0679
See application file for complete search history.

(56) References Cited

U.S. PATENT DOCUMENTS

| | | | |
|---|---|---|---|
| 2016/0116968 A1* | 4/2016 | Thangaraj | G06F 1/3268 713/320 |
| 2019/0235774 A1* | 8/2019 | Benisty | G11C 16/30 |
| 2021/0173587 A1* | 6/2021 | Shin | G06F 12/0246 |
| 2024/0184458 A1* | 6/2024 | Oh | G06F 3/0659 |

* cited by examiner

*Primary Examiner* — Jason W Blust
(74) *Attorney, Agent, or Firm* — NICHOLSON DE VOS WEBSTER & ELLIOTT LLP

(57) ABSTRACT

Methods, systems, and apparatuses include determining that a portion of a target block of a memory operation being performed by a memory division is retired. A partially good block power value is retrieved in response to determining that the portion is retired. A total power estimate is determined using the partially good block power value. Performance of a suboperation of the memory operation by the memory division is delayed in response to determining that the total power estimate satisfies a power threshold.

20 Claims, 7 Drawing Sheets

POWER MANAGEMENT FOR MEMORY DEVICES WITH PARTIALLY GOOD BLOCKS

TECHNICAL FIELD

The present disclosure generally relates to power management for memory devices, and more specifically, relates to power management for memory devices with partial blocks.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
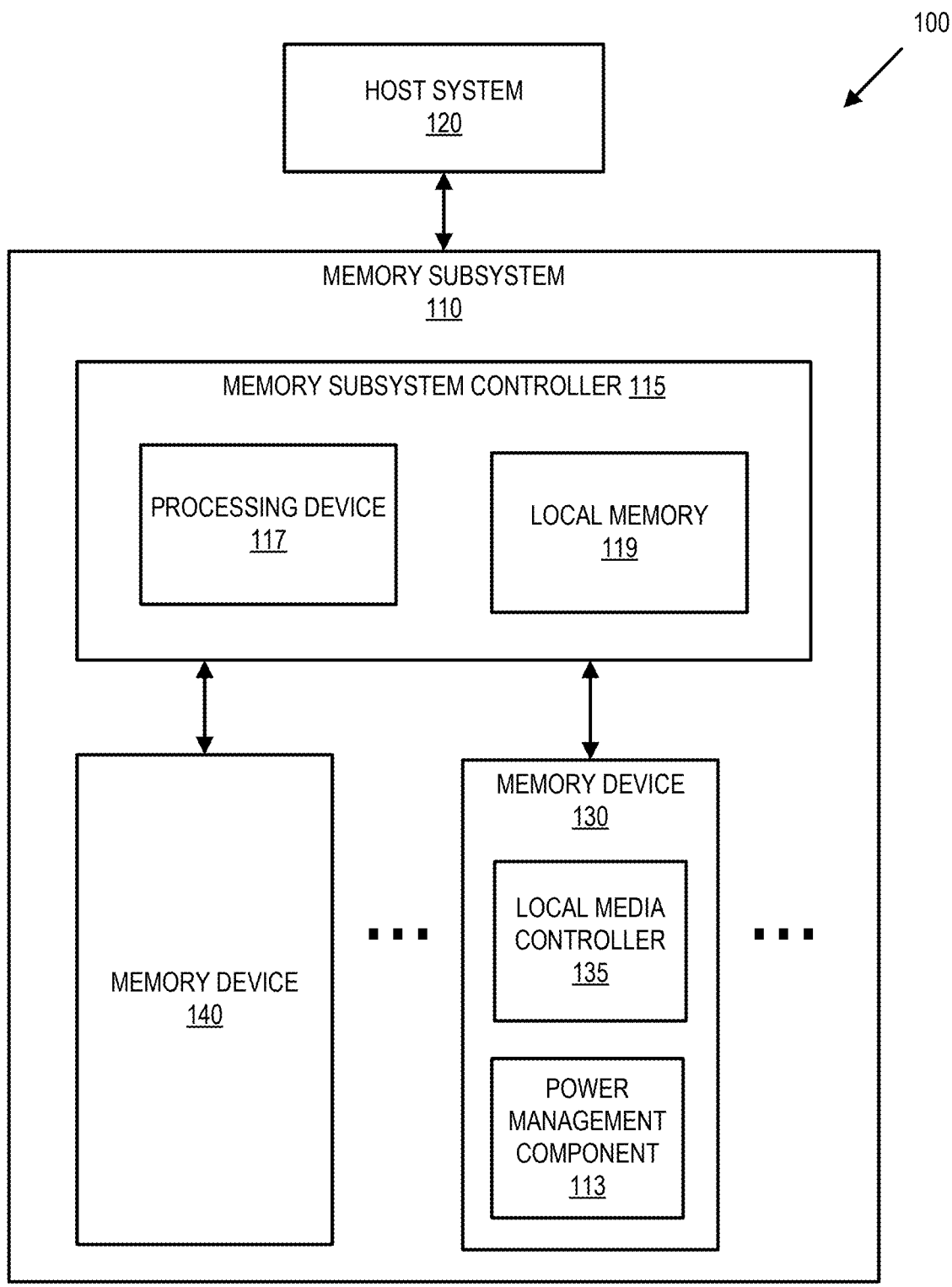
FIG. 1 illustrates an example computing system that includes a memory subsystem in accordance with some embodiments of the present disclosure.

Aspects of the present disclosure are directed to power management in a memory subsystem for memory devices with partial blocks. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units identified by a logical unit number (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), quad-level cells (QLCs), and penta-level cells (PLCs). For example, an SLC can store one bit of information and has two logic states while a QLC can store sixteen bits of information and has sixteen logic states.

In conventional memory systems, memory subsystems implement peak power management techniques to manage the power limitations of the memory devices in the memory subsystem. For example, memory subsystems measure/estimate current consumption of memory dice in a memory device and prevent memory operations that would cause the cumulative current consumption of the memory dice to exceed the system power budget of the memory device. This prevents the supply voltage from drooping (e.g., when the system power budget is exceeded) which in turn prevents malfunctioning in the memory device due to lower than expected supply voltage.

Conventional memory systems sometimes also employ partial block and/or partially good block techniques. For example, partial blocks are memory blocks that only partially contain valid data. The other portion(s) of the partial block can be invalid data (e.g., data waiting for garbage collection) and/or erased data. Similarly, partially good blocks are memory blocks where a portion of the memory block has been retired due to risk of or detected defect. For example, as the number of wordline tiers increase, the risk of defects in wordlines likewise increases. As used herein, the portion of the target block refers to a subset of memory cells within the target block that can be retired while maintaining use of the target block. In some embodiments, the processing device uses wordlines and/or wordline groups as portions of the target block (e.g., for partial blocks). In some embodiments, the processing device uses decks as portions of the target block (e.g., for partially good blocks). Due to uneven wear and/or manufacturing defects, some portions of a memory block can wear out faster than others leading to defects. In response to this, memory subsystems can retire a portion of the memory block deemed defective while maintaining memory operation in the other portion(s).

Implementations using partial blocks and partially good blocks, can experience problems with their peak power management techniques as described above. For example, the current consumption for memory dice is characterized under an assumed full block condition. The peak current for memory operations performed on partial blocks and partially good blocks, however, exceeds the peak current for memory operations performed on full blocks. Accordingly, memory subsystems that assume a full block current consumption can exceed the system power budget if multiple memory dice simultaneous draw partial block peak power (e.g., simultaneous memory operations on memory partial blocks). Similarly, memory subsystems that assume a higher partial block current consumption cause unnecessary performance drops when memory operations are performed on full blocks (e.g., system does not operate at full capacity and some memory operations are unnecessarily delayed).

Aspects of the present disclosure address the above and other deficiencies by estimating power consumption for partial blocks and partially good blocks. For example, the memory subsystem estimates power consumption for memory dice based on whether the memory operation is being performed on a full block or a partial block/partially good block. Accordingly, the memory subsystem more accurately estimates power consumption, reducing the likelihood of exceeding the system power budget (and therefore the associated supply voltage droop) while maintaining maximum performance.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processing device such as a processor chipset and a software stack executed by the processor chipset. The processor chipset can include one or more cores, one or more caches, a memory controller (e.g., NVDIMM controller), and/or a storage protocol controller (e.g., a peripheral component interconnect express (PCIe) controller, a serial advanced technology attachment (SATA) controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a SATA interface, including a mini-SATA (mSATA) interface, a PCIe interface, including a mini PCIe (mPCIE) interface, a Non-Volatile Memory Express (NVMe) interface, a universal serial bus (USB) interface, an a Fibre Channel, Serial Attached SCSI (SAS), a Small Computer System Interface (SCSI), a double data rate (DDR) memory bus, a dual in-line memory module (DIMM) interface (e.g., DIMM socket interface that supports Double Data Rate (DDR)), an Advanced Host Controller (AHCI) interface, an Open NAND Flash Interface (ONFI) interface, a Double Data Rate (DDR) interface, a Low Power Double Data Rate (LPDDR) interface, any other interface, and/or combinations of these interfaces. The physical host interface can be used to transmit data between the host system 120 and the memory subsystem 110. The host system 120 can further utilize an NVMe interface to access components (e.g., memory devices 130 and 140) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via the same communication connection, multiple separate communication connections, and/or a combination of communication connections.

The memory devices 130 and 140 can include any combination of the different types of non-volatile memory devices and/or volatile memory devices. The volatile memory devices (e.g., memory device 140) can be, but are not limited to, random-access memory (RAM), such as dynamic random-access memory (DRAM), synchronous dynamic random-access memory (SDRAM), video random-access memory (VRAM), and cache memory.

Some examples of non-volatile memory devices (e.g., memory device 130) include negative-and (NAND) type flash memory devices and write-in-place type memory devices, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), Spin Transfer Torque (STT)-MRAM, nano-RAM (NRAM), silicon-oxide-nitride-oxide-silicon (SONOS) memory, conductive bridging RAM (CBRAM), resistive random-access memory (RRAM), oxide based RRAM (OxRAM), negative-or (NOR) flash memory, and erasable programmable read-only memory (EPROM), including electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The buffer memory of subsystem controller 115 can include any of the volatile or non-volatile memory types mentioned above including combinations thereof. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in memory subsystem 110 (e.g., stored in a local memory 119). In some examples, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processing device or controller separate from the memory subsystem 110).

In general, the memory subsystem controller 115 can receive commands or operations from the host system 120 and can convert the commands or operations into instructions or appropriate commands to achieve the desired access to the memory devices (e.g., memory devices 130 and/or 140). The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA) and/or namespace) and a physical address (e.g., physical block address) that are associated with the memory devices (e.g., memory devices 130 and/or 140). The memory subsystem controller 115 can further include host interface circuitry to communicate with the host system 120 via the physical host interface. The host interface circuitry can convert the commands received from the host system into command instructions to access the memory devices (e.g., memory devices 130 and/or 140) as well as convert responses associated with the memory devices into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices (e.g., memory devices 130 and/or 140).

In some embodiments, the memory devices (e.g., memory devices 130 and/or 140) include local media controllers 135 that operate in conjunction with memory subsystem controller 115 to execute operations on one or more memory cells of the memory devices (e.g., memory devices 130 and/or 140). An external controller (e.g., memory subsystem controller 115) can externally manage the memory devices (e.g., perform media management operations on the memory devices 130 and/or 140). In some embodiments, a memory device (e.g., memory device 130) is a managed memory device, which is a raw memory device combined with a local controller (e.g., local controller 135) for media management within the same memory device package. An example of a managed memory device is a managed NAND (MNAND) device.

The memory subsystem 110 includes a power management component 113 that manages memory operations based on power constraints of memory subsystem 110, memory device 130, and/or divisions of memory device 130. In some embodiments, local media controller 135 includes at least a portion of the power management component 113. For example, local media controller 135 can include a processing device for performing the operations described herein. In some embodiments, multiple power management components 113 are included in divisions of memory device 130. For example, each memory die within memory device 130 includes a power management component 113 for managing the memory operations of that memory die based on shared power constraints of memory device 130 and/or a memory dice package to which that memory die belongs. In some embodiments, the controller 115 includes at least a portion of the power management component 113. For example, the controller 115 can include a processing device 117 configured to execute instructions stored in local memory 119 for performing the operations described herein. In some embodiments, a power management component 113 is part of the host system 120, an application, or an operating system.

The power management component 113 manages memory operations based on power constraints for memory devices in the memory subsystem by estimating power consumption for memory devices and/or divisions of memory devices (such as memory dice) and allowing or delaying memory operations from executing based on the estimated power consumption. Further details with regards to the operations of the power management component 113 are described below.

Figure 2:
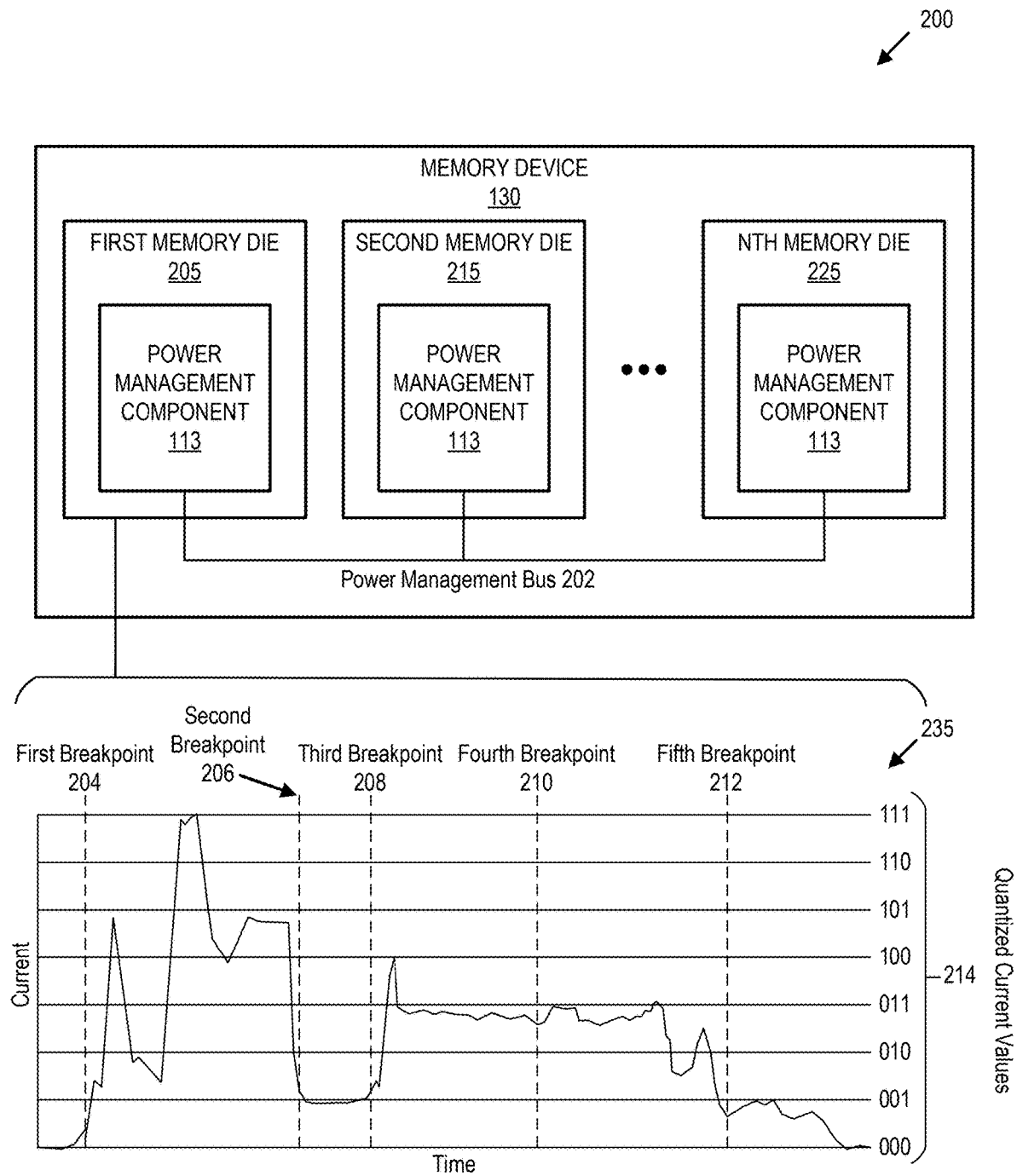
FIG. 2 illustrates an example computing system that includes a power management component in accordance with some embodiments of the present disclosure.

FIG. 2 illustrates an example computing system 200 that includes a power management component 113 in accordance with some embodiments of the present disclosure. Computing system 200 illustrates a memory device 130 including multiple divisions such as first memory die 205, second memory die 215, and nth memory die 225 that are part of a shared power network (e.g., a power management group). For example, first memory die 205, second memory die 215, and nth memory die 225 reside in a single semiconductor or similar package, such as a system in package or another three-dimensional integrated circuit package. In such an example, the shared power network provides power to the package and cumulative power consumption is across multiple memory dice (e.g., first memory die 205, second memory die 215, and nth memory die 225). Although illustrated as including three memory dice, memory device 130 can include any number of memory dice. Similarly, although illustrated as memory dice, similar operations can be performed at varying levels of granularity for divisions of the memory device, such as between multiple memory dice packages in memory device 130 and/or between subdivisions of memory dice. As shown in FIG. 2, each of first, second, and nth memory dice 205, 215, and 225 includes a power management component 113 connected through a common power management bus 202.

In some embodiments, the power management component 113 for first memory die 205 receives memory die power values over power management bus 202 from power management components 113 of other memory dice in a power management group. For example, power management component 113 for first memory die 205 receives memory die power values over power management bus 202 from second memory die 215 and nth memory die 225. As used herein, power values refer to values reflecting power consumption for members of a memory power management group. Power values can therefore include different measurements of power consumption such as current, power, etc. Some examples below use the term current values to refer to power values that reflect current consumption. In some embodiments, power management component 113 of first memory die 205 stores the memory die power values from other memory die for future power calculations. For example, first memory die 205 stores the memory die power values received from second memory die 215 and nth memory die 225 in memory and retrieves the memory die power values from memory when calculating a total power estimate for the power management group. In such an example, first memory die 205 can update the memory die power values in response to receiving new memory die power values from second memory die 215 and/or nth memory die 225 over power management bus 202.

In some embodiments, one of the memory dice serves as a bus master and assigns a time slot to each power management component 113 to send the respective memory die power values. For example, first memory die 205 serves as the bus master and power management component 113 of second memory die 215 and nth memory die 225 send their respective memory die power values at times designated via round robin scheduling or another bus sharing algorithm designated by first memory die 205. In some embodiments, power management bus 202 is a multi-master bus and each of first memory die 205, second memory die 215, and nth memory die 225 use a bus arbitration scheme to select a new master when a current master enters an inactive state. In other embodiments, each of first memory die 205, second memory die 215, and nth memory die 225 contends for power management bus 202 until all active memory dice have transmitted their respective memory die power values.

In some embodiments, the memory die power values are quantized power values reflecting the current consumption for a memory operation being performed by that memory die. For example, first memory die 205 performs a memory operation with current consumption illustrated by memory operation power consumption graph 235. Memory operation power consumption graph 235 is illustrated for the purpose of explanation and reflects the current consumption (reflected by the y axis) for a hypothetical read operation being performed by first memory die 205 on a partial block over a given period of time (reflected by the x axis).

As shown in memory operation power consumption graph 235, the current values along the y axis are broken up into quantized ranges reflected by quantized current values 214. For example, in the embodiment illustrated in memory operation power consumption graph 235, the current values are broken into eight quantized ranges reflected by the quantized current values 214 of '000', '001', '010', '011', '100', '101', '110', and '111'. Although three bits are used for quantized current values 214 in the illustrated example, any number of bits or other method of measuring and/or quantizing the current consumption may be used. Similarly, although illustrated using current, other measures of measuring power may be used.

As also shown in memory operation power consumption graph 235, the memory operation is also broken up into time intervals (e.g., suboperations) along the x axis separated by first, second, third, fourth, and fifth breakpoints 204, 206, 208, 210, and 212. It will be appreciated that the number and placement of breakpoints (and therefore the number and placement of suboperations) may vary by memory operation and memory device/die as will be explained in further detail below. In some embodiments, the first, second, third, fourth, and fifth breakpoints 204, 206, 208, 210, and 212 are firmware breakpoints of power management component 113 for managing the power consumption of first memory die 205. For example, power management component 113 of first memory die 205 can determine, at each breakpoint, whether the current consumption for the next suboperation of the memory operation (e.g., illustrated by memory operation power consumption graph 235), when added to the memory die power values from both second memory die 215 and nth memory die 225 will cause the total power estimate to exceed the power threshold of memory device 130. Power management component 113 determines whether to execute or postpone execution of the next suboperation of the memory operation at each breakpoint based on whether the total power estimate will exceed the power threshold as described in further detail below.

In some embodiments, power management component 113 determines different breakpoints for the same memory operation based on whether the memory operation targets a memory division with full blocks, partial blocks, and/or partially good blocks. For example, the power consumption waveforms (e.g., memory operation power consumption graph 235) for the same memory operation can differ depending on whether the memory operation is being performed on a full block, a partial block, or a partially good block. As a further example, a memory operation including a pass gate bias voltage application can include different breakpoints for the end of the pass gate bias voltage application for a full block, a partial block, and/or a partially good block due to the different power consumption waveforms.

In some embodiments, in response to receiving a memory command, first memory die 205 executes an associated memory operation. For example, first memory die 205 receives a read command from memory subsystem controller 115 of FIG. 1 and begins to execute the read command. In some embodiments, first memory die 205 receives multiple memory commands (e.g., from memory subsystem controller 115 of FIG. 1) and stores the received memory commands in a cache. First memory die 205 can then determine which memory command (or which suboperation of a memory command) to execute based at least in part on the power calculations provided by power management component 113 of first memory die 205.

In one embodiment, as shown in FIG. 2, first memory die 205 begins to execute a memory read operation with current consumption as illustrated by memory operation power consumption graph 235. At each breakpoint, power management component 113 of first memory die 205 determines a memory die power value for the read operation. For example, at first breakpoint 204, power management component 113 determines whether the memory operation is targeting a full block, a partial block, or a partially good block. Power management component 113 determines a memory die power value using the estimated current consumption for the following segment of the memory read operation and the type of block that the operation is targeting (e.g., a full block, a partial block, or a partially good block). Power management component 113 determines, using the memory die power value (e.g., for a given time interval between breakpoints), whether the associated memory die (e.g., first memory die 205) can perform the memory operation without causing the power consumption for the power management group to exceed the power threshold for that group. For example, power management component 113 aggregates the memory die power value with memory die power values for other memory die in the same power management group (e.g. second memory die 215 and nth memory die 225) to generate a total power estimate for the power management group. Power management component 113 determines whether the total power estimate satisfies a power threshold for the power management group. For example, power management component 113 determines whether the total power estimate exceeds a peak power threshold for the power management group. If power management component 113 determines that the total power estimate exceeds the peak power threshold for the power management group, power management component 113 postpones the next segment of the memory read operation. If power management component 113 determines that the total power estimate does not exceed the peak power threshold for the power management group, power management component 113 executes the next segment of the memory read operation.

In some embodiments, power management component 113 determines whether the memory operation is targeting a full block, a partial block, or a partially good block using a memory address of the received memory command. For example, power management component 113 determines whether the memory address corresponds with a full block, a partial block, or a partially good block using a look-up table. In some embodiments, in response to determining that the memory operation is targeting a partial block, power management component 113 determines a fill amount for the partial block. For example, power management component 113 determines a number of portions written to a partial block using a look-up table. The number of portions of the block can be a number of wordlines and/or wordline groups written to the partial block. Further details regarding the fill amount are described in further detail with reference to FIG. 3. Similarly, in some embodiments, in response to determining that the memory operation is targeting a partially good block, power management component 113 determines a number of retired portions for the partially good block. For example, power management component 113 determines a proportion of the partially good block that is retired and/or a proportion of the partially good block that is not retired using a look-up table. Further details regarding the number of retired portions are described in further detail with reference to FIG. 4.

In some embodiments, power management component 113 sends the memory die power value for the next segment of the memory operation over power management bus 202. For example, during its turn in the bus sharing algorithm, power management component 113 sends a memory die power value corresponding with the next segment of the memory operation in response to determining to execute the memory operation (e.g., determining that the total power estimate does not exceed the power threshold). For example, first memory die 205 sends a memory die power value over power management bus 202 according to the quantized current value 214 for the current suboperation of the memory operation being performed. In one embodiment, as illustrated in FIG. 2, for the start of memory operation power consumption graph 235 until first breakpoint 204, first memory die 205 sends a memory die power value of '001' over power management bus 202 reflecting the maximum current consumption (e.g., the highest current peak) for first memory die 205 during that suboperation of the memory operation. Similarly, for first breakpoint 204 until second breakpoint 206, first memory die 205 sends a memory die power value of '111', for second breakpoint 206 until third breakpoint 208, first memory die 205 sends a memory die power value of '010', for third breakpoint 208 until fifth breakpoint 212, first memory die 205 sends a power value of '100', and from fifth breakpoint 212 until the end of memory operation power consumption graph 235, first memory die 205 sends a memory die power value of '001'. In some embodiments, the highest quantized current value 214 (e.g., '111') is associated with the highest current consumption for the memory die and the lowest quantized current value 214 (e.g., '000') is associated with no current consumption. In such an embodiment, each of the intermediary quantized current values 214 can reflect equal current consumption intervals.

In some embodiments, power management component 113 for first memory die 205 sends a memory die power value by aggregating the quantized current value 214 for the current memory operation being performed by first memory die 205 with other operations of first memory die 205. For example, power management component 113 determines a current value for the quantized current value 214 using a lookup table and aggregates the current value from the lookup table with current values for other operations of first memory die 205. In such an example, power management component 113 sends a memory die power value reflecting the aggregation of current values for first memory die 205 (e.g., including the current value for the memory operation being performed).

Figure 3:
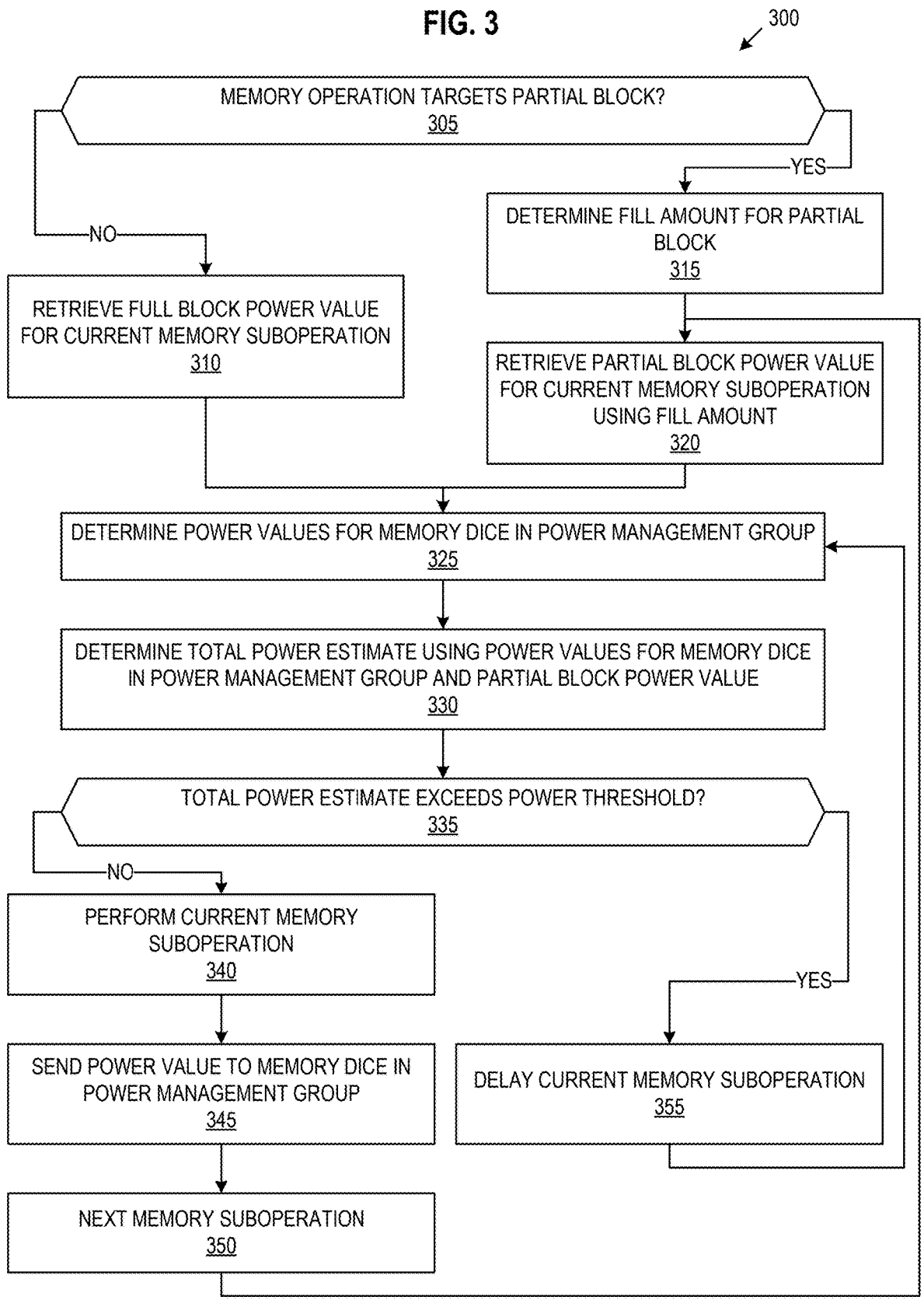
FIG. 3 is a flow diagram of an example method to manage power for memory devices with partial blocks in accordance with some embodiments of the present disclosure.

FIG. 3 is a flow diagram of an example method 300 to manage power for memory devices with partial blocks, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the power management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device determines whether a memory operation targets a partial block. For example, memory device 130 receives a memory command from a memory subsystem controller (e.g., memory subsystem controller 115 of FIG. 1) targeting first memory die 205.

Power management component 113 of first memory die 205 determines whether the memory operation includes a memory address for a partial block of first memory die 205. For example, power management component 113 retrieves a look-up table for partial blocks for first memory die 205 and determines whether the memory address for the memory operation targets a partial block using the look-up table. If the processing device determines that the memory operation targets a partial block, the method 300 proceeds to operation 315. If the processing device determines that the memory operation does not target a partial block, the method 300 proceeds to operation 310. In some embodiments, if the processing device determines that the memory operation does not target a partial block, the processing device determines whether the memory operation targets a partially good block as discussed in further detail with reference to FIG. 4.

At operation 310, the processing device retrieves a full block power value of the current suboperation of the memory operation. For example, power management component 113 of first memory die 205 retrieves an estimate for the peak current for the current suboperation of the memory operation to be performed on a full block. A suboperation of a memory operation is, for example, the execution of the memory operation between two breakpoints (e.g., between any of first breakpoint 204, second breakpoint 206, third breakpoint 208, fourth breakpoint 210, and/or fifth breakpoint 212). In some embodiments, the full block power value for the current suboperation of the memory operation is less than the partial block power value for the current suboperation of the memory operation. For example, during read operations on partial blocks, more peak current is needed than for full blocks in order to drain out any residual charges in the channels of the non-written memory cells to prevent hot carrier injection from these memory cells to the written memory cells in the following read sensing operation.

At operation 315, the processing device determines a fill amount for the partial block. For example, power management component 113 of first memory die 205 determines a number of portions that have been written to the partial block (e.g., a number of wordlines and/or a number of wordline groups). In some embodiments, power management component 113 retrieves the number of written wordlines and/or wordline groups using a look-up table. For example, power management component 113 retrieves the number of written wordlines and/or wordline groups using the memory address for the memory operation.

In some embodiments, the processing device also determines a count of memory divisions in the power management group. For example, power management component 113 of first memory die 205 determines how many memory dice are included in the power management group including first memory die 205, second memory die 215, and nth memory die 225.

At operation 320, the processing device retrieves a partial block power value for the current suboperation of the memory operation using the fill amount. For example, power management component 113 of first memory die 205 retrieves an estimate for the peak current for the current suboperation of the memory operation to be performed on the partial block. In some embodiments, the smaller the fill amount for the partial block, the larger the partial block power value. For example, partial blocks with fewer written wordlines and/or wordline groups will have higher partial block power values than partial blocks with more written wordlines and/or wordline groups for the same suboperation of a same type of memory operation.

In one embodiment, the processing device retrieves one of six power values for the partial block. For example, if the suboperation of the memory operation is a pass gate bias application for a partial block with thirty two total wordlines, the current value for 0-4 written wordlines is 200 milliamps, the current value for 5-9 written wordlines is 195 milliamps, the current value for 10-14 written wordlines is 190 milliamps, the current value for 15-19 written wordlines is 185 milliamps, the current value for 20-24 written wordlines is 180 milliamps, and the current value for 25-31 written wordlines is 175 milliamps.

In some embodiments, the processing device retrieves a power value based on the count of memory divisions in the power management group. For example, power management component 113 of first memory die 205 retrieves a power value using the count of memory dice in the power management group including second memory die 215 and nth memory die 225. In one embodiment, the processing device retrieves a power value and adds an offset using the count of memory dice in the power management group. For example, power management component 113 of first memory die 205 determines an offset for the power value based on the count of memory dice in the power management group with higher offsets for large numbers of memory dice.

At operation 325, the processing device determines power values for memory dice in the power management group. For example, power management component 113 of first memory die 205 determines power values for memory dice in the same power management group including second memory die 215 and nth memory die 225. In some embodiments, power management component 113 of first memory die 205 receives the power values from power management components of the other memory die over power management bus 202 (e.g., power management component 113 of second memory die 215 and/or power management component 113 of nth memory die 225). In some embodiments, in response to receiving the power values, power management component 113 of first memory die 205 stores the power values for future use. For example, power management component 113 of first memory die 205 stores the power values for second memory die 215 and nth memory die 225 in a local memory of first memory die 205. In some embodiments, power management component 113 of first memory die 205 determines the power values for other memory dice in the power management group by retrieving the power values from the local memory. For example, power management component 113 of first memory die 205 retrieves the most recent power values for all memory dice in the power management group.

At operation 330, the processing device determines a total power estimate using power values for the memory dice in the power management group. For example, assuming the memory operation targets a partial block, power management component 113 of first memory die 205 determines a total power estimate for the power management group including first memory die 205, second memory die 215, and nth memory die 225 using the most recently received power values for second memory die 215 and nth memory die 225 retrieved from local memory and the partial block power value for the current suboperation of memory operation operating on first memory die 205.

In some embodiments, power management component 113 of first memory die 205 determines the total power estimate by adding the power values for the other memory dice in the power management group with the block power value for the current suboperation of the memory operation for first memory die 205. In some embodiments, power management component 113 of first memory die 205 determines the total power estimate by determining power estimates associated with each of the power values and adding the power estimates to determine the total power estimate. For example, power management component 113 received quantized power values from other power management components of the power management group and uses a look-up table to determine the relevant power estimates for those quantized power values. In one embodiment, power management component 113 determines current consumption values for the received quantized power values and adds the current consumption values with the current consumption for the current suboperation of the memory operation to determine the total power estimate.

At operation 335, the processing device determines whether the total power estimate satisfies the power threshold. For example, power management component 113 of first memory die 205 compares the total power estimate for the memory dice in the power management group to a power threshold for the power management group. In some embodiments, the power threshold is a peak power threshold for the power management group. For example, the power threshold is a maximum amount of peak current (e.g., system power budget) allotted for memory device 130 to prevent voltage drooping and malfunctions in memory device 130. In some embodiments, the processing device uses a power threshold retrieved from memory. For example, power management component 113 of first memory die 205 retrieves a power threshold for the power management group (e.g., memory device 130) from a local memory and compares the total power estimate for the current power consumption of the power management group to the retrieved power threshold. In some embodiments, the processing device uses a power threshold based on the count of memory divisions in the power management group. For example, power management component 113 of first memory die 205 retrieves a power threshold using the count of memory dice in the power management group including second memory die 215 and nth memory die 225. If the processing device determines that the total power estimate satisfies (e.g., exceeds) the power threshold, the method 300 proceeds to operation 355. If the processing device determines that the total power estimate does not satisfy (e.g., does not exceed) the power threshold, the method 300 proceeds to operation 340.

At operation 340, the processing device performs the current suboperation of the memory operation. For example, in response to determining that the total power estimate for the power management group including the performance of the current suboperation of the memory operation does not exceed the power threshold, first memory die 205 executes the current suboperation of the memory operation until the next breakpoint in the memory operation.

In some embodiments, the processing device determines the next breakpoint using the fill amount. For example, power management component 113 of first memory die 205 uses different breakpoints for the same type of memory operation executed on memory portions with different fill amounts. In such an embodiment, power management component 113 retrieves breakpoints for the memory operation using the fill amount for the partial block targeted by the memory operation. For example, power management component 113 retrieves breakpoints from a local memory using the fill amount. The breakpoints can correspond with, for example, memory suboperations that are a subset of the memory operation.

At operation 345, the processing device sends the power value to memory dice in the power management group. For example, power management component 113 of first memory die 205 sends a power value to the other memory dice in the power management group over power management bus 202. The power value includes the block power value for the current suboperation of memory operation. For example, the power value is an estimate of the power consumed by first memory die 205 including the power consumed for operation of the current suboperation of the memory operation.

In some embodiments, power management component 113 of first memory die 205 sums the block power value for the current suboperation of the memory operation with other power consumption indicators for the first memory die 205 and sends the result over power management bus 202 as the power value for first memory die 205. For example, the power value can include power consumption for other operations of first memory die 205 performed in parallel with the current suboperation of the memory operation. In response to receiving the power value from power management component 113 of first memory die 205, power management components 113 of other memory dice in the power management group can store the power value for first memory die 205 for use in future power determination operations. For example, power management component 113 of second memory die 215 saves the power value received from power management component 113 of first memory die 205 to determine total power estimates for its own memory operations.

In some embodiments, power management component 113 of first memory die 205 sends a quantized power value using the power consumption estimate for the current suboperation of the memory operation. For example, power management component 113 of first memory die 205 determines retrieves a quantized power value from a look-up table stored in memory using a power consumption estimate for first memory die 205. The power consumption estimate can include, for example, the estimated power consumption for the performance of the current suboperation of the memory operation as well as the power consumption for parallel processes of first memory die 205.

At operation 350, the processing device proceeds to the next suboperation of the memory operation. For example, power management component 113 of first memory die 205 proceeds to the next suboperation of the memory operation to be performed using the breakpoints for the memory operation. In some embodiments, as discussed above, the processing device determines the breakpoints using the fill amount. For example, power management component 113 uses different breakpoints based on the amount of data written to first memory die 205.

At operation 355, the processing device delays the current suboperation of the memory operation. For example, in response to determining that the total power estimate for the power management group satisfies the power threshold, power management component 113 of first memory die 205 delays the performance of the current suboperation of the memory operation. In some embodiments, power management component 113 delays the performance by a certain amount of time. For example, power management component 113 of first memory die 205 waits a predetermined amount of time before determining the updated power values for other memory dice in the power management group. In some embodiments, power management component 113 delays the performance of the current suboperation of the memory operation and only determines power values for the other memory dice in the power management group in response to receiving a new power value from a memory dice in the power management group. For example, power management component 113 of first memory die 205 determines that the total power estimate satisfies the power threshold and delays the performance of the current suboperation of the memory operation until it receives an updated power value from the power management components 113 of second memory die 215 and/or nth memory die 225.

Figure 4:
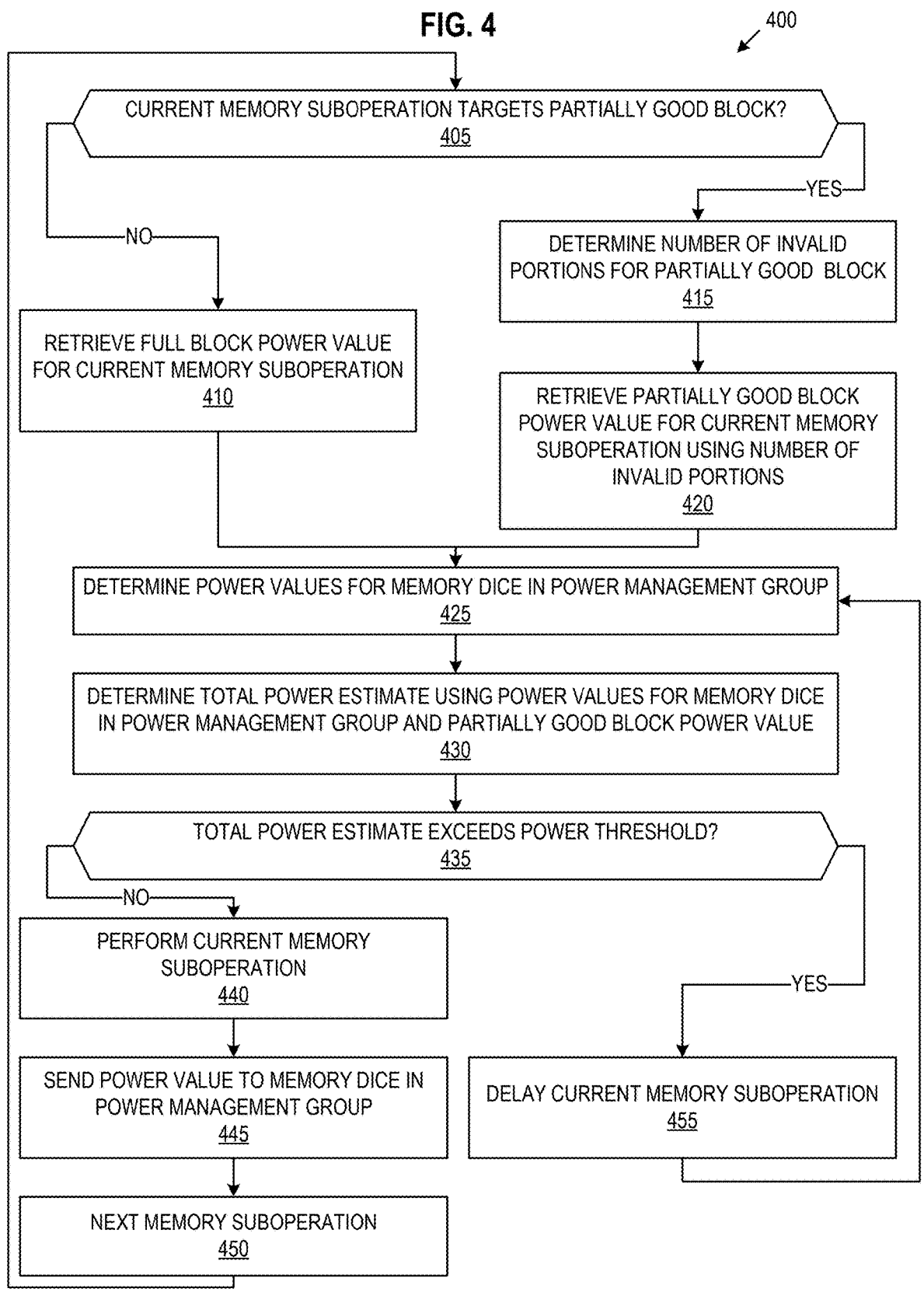
FIG. 4 is another flow diagram of an example method to manage power for memory devices with partial blocks in accordance with some embodiments of the present disclosure.

FIG. 4 is a flow diagram of another example method 400 to manage power for memory devices with partially good blocks, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the power management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device determines whether the current suboperation of a memory operation targets a partially good block. For example, memory device 130 receives a memory command from a memory subsystem controller (e.g., memory subsystem controller 115 of FIG. 1) targeting first memory die 205. Power management component 113 of first memory die 205 determines whether the memory operation includes a memory address for a partially good block of first memory die 205. For example, power management component 113 retrieves a look-up table indicating memory blocks of first memory die 205 that include retired portions and determines whether the memory address for the memory operation targets memory block that includes a retired portion (e.g., whether the targeted memory block is a partially good block) using the look-up table. If the processing device determines that the memory operation targets a partially good block, the method 400 proceeds to operation 415. If the processing device determines that the memory operation does not target a partially good block, the method 400 proceeds to operation 410. In some embodiments, if the processing device determines that the memory operation does not target a partially good block, the processing device determines whether the memory operation targets a partial block as discussed in further detail with reference to FIG. 3.

At operation 410, the processing device retrieves a full block power value of the current suboperation of the memory operation. For example, power management component 113 of first memory die 205 retrieves an estimate for the peak current for the current suboperation of the memory operation to be performed on a full block. A suboperation of a memory operation is, for example, the execution of the memory operation between two breakpoints (e.g., between any of first breakpoint 204, second breakpoint 206, third breakpoint 208, fourth breakpoint 210, and/or fifth breakpoint 212). In some embodiments, the full block power value for the current suboperation of the memory operation is less than the partially good block power value for the current suboperation of the memory operation. For example, performing a read operation on a partially good block requires more power than performing the read operation on a full block because the retired portions of the partially good block are maintained in an erased state, resulting in higher required voltages to drain any residual charges in the cell channels.

At operation 415, the processing device determines a number/count of invalid portions for the partially good block. For example, power management component 113 of first memory die 205 determines a number of retired decks for the partially good block. In some embodiments, the number of retired portions is measured as proportion or fraction. For example, for memory blocks with three decks or other separately managed portions, power management component 113 maintains a look-up table indicating memory addresses (e.g., memory blocks) with no invalid portions (e.g., a full block), with one third of the total portions retired, or with two thirds of the total portions retired. In some embodiments, the processing device also determines a count of memory divisions in the power management group. For example, power management component 113 of first memory die 205 determines how many memory dice are included in the power management group including first memory die 205, second memory die 215, and nth memory die 225.

At operation 420, the processing device retrieves a partially good block power value for the current suboperation of the memory operation using the number of invalid portions. For example, power management component 113 of first memory die 205 retrieves an estimate for the peak current for the current suboperation of the memory operation to be performed on the partially good block. In some embodiments, the more retired portions for the block (e.g., larger proportion of retired portions), the larger the partially good block power value. For example, partial blocks with more retired portions will have higher partially good block power values than blocks with fewer retired portions for the same suboperation of a same type of memory operation.

At operation 425, the processing device determines power values for memory dice in the power management group. For example, power management component 113 of first memory die 205 retrieves power values previously sent by the other memory dice in the power management group. Further details regarding determining power values for memory dice in the power management group are discussed with reference to FIG. 3.

At operation 430, the processing device determines a total power estimate using power values for the memory dice in the power management group. For example, power management component 113 determines a total power estimate by determining power estimates for each of the memory dice in the power management group using received quantized power values. In such an example, power management component 113 can add the power estimates with the power estimate for the current suboperation of the memory operation as well as other power consuming operations of first memory die 205 to determine the total power estimate for the power management group. Further details regarding determining a total power estimate are discussed with reference to FIG. 3.

At operation 435, the processing device determines whether the total power estimate satisfies the power threshold. For example, power management component 113 determines whether the determine total power estimate is greater than a peak power threshold for the power management group. In some embodiments, the processing device determines a power threshold for the power management group using the number of memory dice in the power management group. If the processing device determines that the total power estimate satisfies (e.g., exceeds) the power threshold, the method 400 proceeds to operation 455. If the processing device determines that the total power estimate does not satisfy (e.g., does not exceed) the power threshold, the method 400 proceeds to operation 440. Further details regarding determining whether the total power estimate satisfies the power threshold are discussed with reference to FIG. 3.

At operation 440, the processing device performs the current suboperation of the memory operation. For example, first memory die 205 executes the suboperation of the memory operation until the next breakpoint in the memory operation (e.g., from first breakpoint 204 until second breakpoint 206). In some embodiments, the processing device determines the next breakpoint for the memory operation. For example, the processing device determines the next breakpoint for the memory operation using the number of retired portions. Further details regarding performing the current suboperation of the memory operation are discussed with reference to FIG. 3.

In some embodiments, the processing device determines the next breakpoint using the number/count of invalid portions. For example, power management component 113 of first memory die 205 uses different breakpoints for the same type of memory operation executed on partially good blocks with different numbers/counts of invalid decks. In such an embodiment, power management component 113 retrieves breakpoints for the memory operation using the number/count of invalid portions for the partially good block targeted by the memory operation. For example, power management component 113 retrieves breakpoints from a local memory using the number/count of invalid decks. The breakpoints can correspond with, for example, memory suboperations that are a subset of the memory operation.

At operation 445, the processing device sends the power value to memory dice in the power management group. For example, power management component 113 of first memory die 205 sends the power value for the current suboperation of the memory operation being performed over power management bus 202 to the other memory dice in the power management group. Further details regarding sending the power value to memory dice in the power management group are discussed with reference to FIG. 3.

At operation 450, the processing device proceeds to the next suboperation of the memory operation. For example, power management component 113 of first memory die 205 proceeds to the next suboperation of the memory operation to be performed using the breakpoints for the memory operation. In some embodiments, as discussed above, the processing device determines the breakpoints using the number of retired portions. For example, power management component 113 uses different breakpoints based on the proportion of retired portions in the memory block.

At operation 455, the processing device delays the current suboperation of the memory operation. For example, in response to determining that the total power estimate for the power management group exceeds the power threshold, power management component 113 of first memory die 205 delays the performance of the current suboperation of the memory operation. Further details regarding delaying the current suboperation of the memory operation are discussed with reference to FIG. 3.

Figure 5:
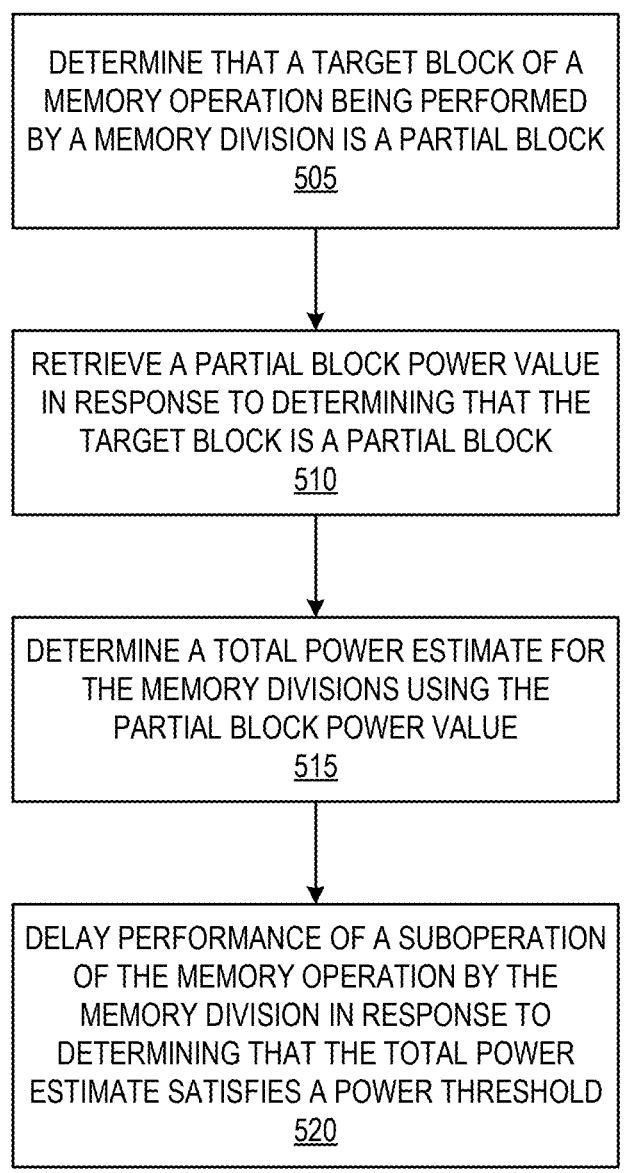
FIG. 5 is another flow diagram of an example method to manage power for memory devices with partial blocks in accordance with some embodiments of the present disclosure.

FIG. 5 is a flow diagram of another example method 500 to manage power for memory devices with partial blocks, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the power management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device determines that a target block of a memory operation being performed by a memory division is a partial block. For example, power management component 113 uses a look-up table and the memory address for the memory operation being performed to determine whether the target block is a partial block. Further details regarding determining that the target block of a memory operation being performed is a partial block are discussed with reference to FIGS. 2 and 3.

At operation 510, the processing device retrieves a partial block power value in response to determining that the target block is a partial block. For example, power management component 113 retrieves a partial block power value corresponding with an estimated power consumption during the next suboperation of the memory operation being performed. In some embodiments, the processing device retrieves a partial block power value using a fill amount of the partial block. Further details regarding retrieving a partial block power value are discussed with reference to FIGS. 2 and 3.

At operation 515, the processing device determines a total power estimate for the memory divisions using the partial block power value. For example, power management component 113 determines power estimates for the other members of the power management group using quantized power values received from the power management group and determines a total power estimate using these power estimates and the partial block power value. Further details regarding determining a total power estimate are discussed with reference to FIGS. 2 and 3.

At operation 520, the processing device delays performance of a suboperation of the memory operation by the memory division in response to determining that the total power estimate satisfies a power threshold. For example, power management component 113 retrieves a power threshold for the power management group and delays the performance of the next suboperation of the currently performing memory operation (or a first suboperation of a memory operation to be performed) in response to determining that the total power estimate exceeds the power threshold. Further details regarding delaying performance of a suboperation of the memory operation in response to determining that the total power estimate satisfies a power threshold are discussed with reference to FIGS. 2 and 3.

Figure 6:
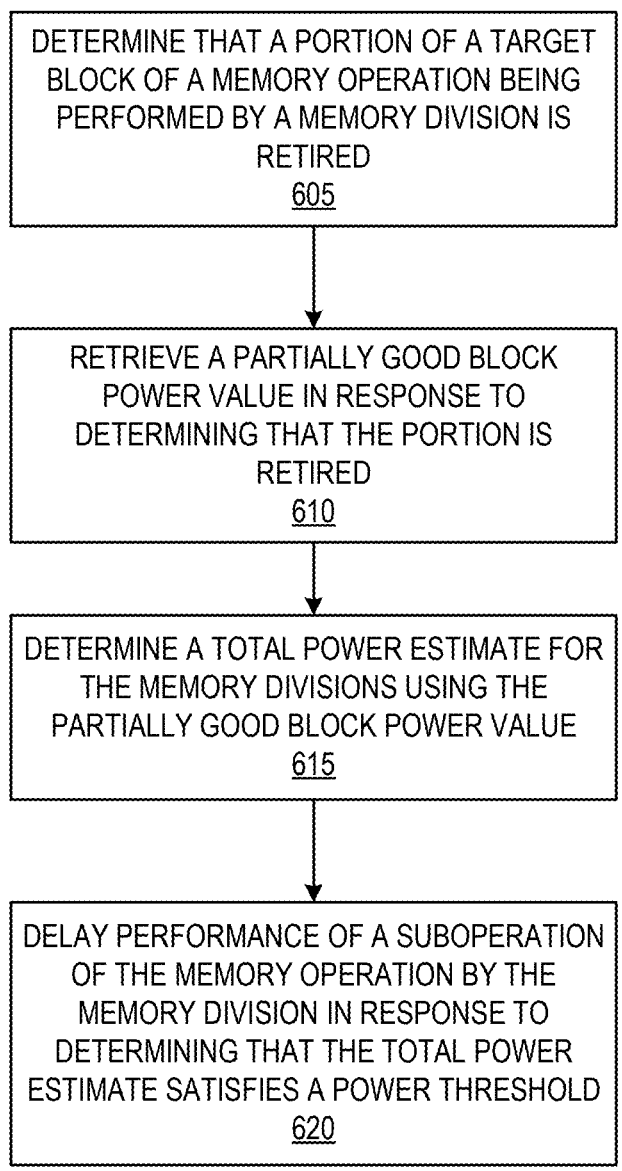
FIG. 6 is another flow diagram of an example method to manage power for memory devices with partial blocks in accordance with some embodiments of the present disclosure.

FIG. 6 is a flow diagram of another example method 600 to manage power for memory devices with partial blocks, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the power management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device determines that a portion of a target block of a memory operation being performed by a memory division is retired. For example, power management component 113 uses a look-up table and the memory address for the memory operation being performed to determine whether the target block includes a retired portion, such as a retired deck. Further details regarding determining that a portion of a target block of a memory operation being performed is retired are discussed with reference to FIGS. 2 and 4.

At operation 610, the processing device retrieves a partially good block power value in response to determining that the portion is retired. For example, power management component 113 retrieves a partially good block power value corresponding with an estimated power consumption during the next suboperation of the memory operation being performed. In some embodiments, the processing device retrieves a partially good block power value using a number of retired portions for the partially good block. Further details regarding retrieving a partially good block power value are discussed with reference to FIGS. 2 and 4.

At operation 615, the processing device determines a total power estimate for the memory divisions using the partially good block power value. For example, power management component 113 determines power estimates for the other members of the power management group using quantized power values received from the power management group and determines a total power estimate using these power estimates and the partially good block power value. Further details regarding determining a total power estimate are discussed with reference to FIGS. 2 and 4.

At operation 620, the processing device delays performance of a suboperation of the memory operation by the memory division in response to determining that the total power estimate satisfies a power threshold. For example, power management component 113 retrieves a power threshold for the power management group and delays the performance of the next suboperation of the currently performing memory operation (or a first suboperation of a memory operation to be performed) in response to determining that the total power estimate exceeds the power threshold. Further details regarding delaying performance of a suboperation of the memory operation in response to determining that the total power estimate satisfies a power threshold are discussed with reference to FIGS. 2 and 4.

Figure 7:
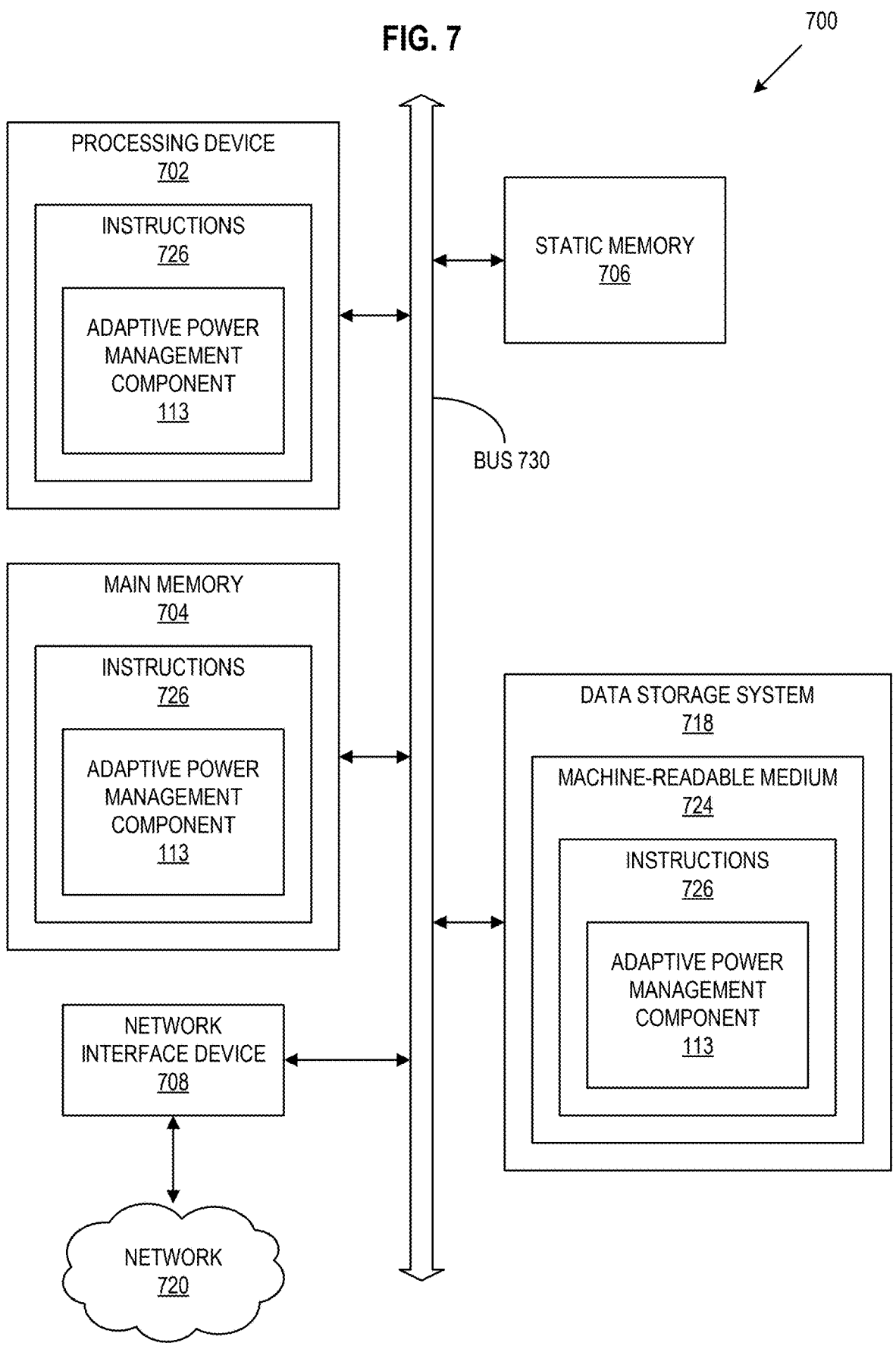
FIG. 7 is a block diagram of an example computer system in which embodiments of the present disclosure may operate.

FIG. 7 illustrates an example machine of a computer system 700 within which a set of instructions for causing the machine to perform any one or more of the methodologies discussed herein can be executed. In some embodiments, the computer system 700 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the power management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a smart device, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random-access memory (DRAM) such as synchronous DRAM (SDRAM) or Rambus DRAM (RDRAM), etc.), a static memory 706 (e.g., flash memory, static random-access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726, constituting machine-readable storage media, can also reside, completely or at least partially, within the main memory 704 and/or within the processing device 702 during execution thereof by the computer system 700, the main memory 704 and the processing device 702. The machine-readable storage medium 724, data storage system 718, and/or main memory 704 can correspond to the memory subsystem 10 of FIG. 1.

In one embodiment, the instructions 726 include instructions to implement functionality corresponding to a power management component (e.g., power management component 113 of FIG. 1). While the machine-readable storage medium 724 is shown in an example embodiment to be a single medium, the term "machine-readable storage medium" should be taken to include a single medium or multiple media that store the one or more sets of instructions (e.g., instructions 726). The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 300, 400, 500, and/or 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMS, EEPROMs, magnetic or optical cards, or any type of media suitable for storing electronic instructions coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
determining that a portion of a target block of a memory operation being performed by a memory division of a plurality of memory divisions is retired;
retrieving, in response to determining that the portion is retired, a partially good block power value, wherein the partially good block power value differs from a full block power value;
determining a total power estimate for the plurality of memory divisions using the partially good block power value; and
delaying performance of a suboperation of the memory operation by the memory division in response to determining that the total power estimate satisfies a power threshold.

2. The method of claim 1, further comprising:
retrieving, in response to determining that the portion is retired, a second partially good block power value for a second suboperation of the memory operation, wherein the second partially good block power value is different from the partially good block power value.

3. The method of claim 1, further comprising:
receiving, from the plurality of memory divisions, a plurality of power values, wherein calculating the total power estimate further uses the plurality of power values.

4. The method of claim 3, further comprising:
receiving, from a second memory division of the plurality of memory divisions, an updated power value;
determining an updated total power estimate for the plurality of memory divisions using the updated power value; and
performing the suboperation of the memory operation by the memory division in response to determining that the updated total power estimate does not satisfy the power threshold.

5. The method of claim 1, wherein determining that the portion of the target block is retired further comprises:
determining a number of retired portions for the target block, wherein retrieving the partially good block power value uses the number of retired portions.

6. The method of claim 1, further comprising:
determining a count of the plurality of memory divisions, wherein retrieving the partially good block power value further uses the count of the divisions.

7. The method of claim 1, wherein determining that the portion of the target block is retired comprises:

retrieving, in response to determining that the portion is retired, a partially good block breakpoint for the memory operation; and determining the suboperation of the memory operation using the partially good block breakpoint.

8. The method of claim 1, further comprising:

determining that a second target block of a second memory operation being performed by a second memory division of the plurality of memory divisions does not include a retired portion, wherein the second memory operation is a same type of memory operation as the memory operation; and retrieving, in response to determining that the second target block does not include a retired portion, the full block power value, wherein the full block power value is less than the partially good block power value.

9. A non-transitory computer-readable storage medium comprising instructions that, when executed by a processing device, cause the processing device to:

determine that a portion of a target block of a memory operation being performed by a memory division of a plurality of memory divisions is retired;

retrieve, in response to determining that the portion is retired, a partially good block power value, wherein the partially good block power value differs from a full block power value;

determine a total power estimate for the plurality of memory divisions using the partially good block power value; and delay performance of a suboperation of the memory operation by the memory division in response to determining that the total power estimate satisfies a power threshold.

10. The non-transitory computer-readable storage medium of claim 9, wherein the processing device is further to:

retrieve, in response to determining that the portion is retired, a second partially good block power value for a second suboperation of the memory operation, wherein the second partially good block power value is different from the partially good block power value.

11. The non-transitory computer-readable storage medium of claim 9, wherein the processing device is further to:

receive, from the plurality of memory divisions, a plurality of power values, wherein calculating the total power estimate further uses the plurality of power values.

12. The non-transitory computer-readable storage medium of claim 11, wherein the processing device is further to:

receive, from a second memory division of the plurality of memory divisions, an updated power value;

determine an updated total power estimate for the plurality of memory divisions using the updated power value; and perform the suboperation of the memory operation by the memory division in response to determining that the updated total power estimate does not satisfy the power threshold.

13. The non-transitory computer-readable storage medium of claim 9, wherein determining that the portion is retired further comprises:

determining a number of retired portions for the target block, wherein retrieving the partially good block power value uses the number of retired portions.

14. The non-transitory computer-readable storage medium of claim 9, wherein the processing device is further to:

determine a count of the plurality of memory divisions, wherein retrieving the partially good block power value uses the count of the divisions.

15. The non-transitory computer-readable storage medium of claim 9, wherein the processing device is further to:

retrieve, in response to determining that the portion is retired, a partially good block breakpoint for the memory operation; and determine the suboperation of the memory operation using the partially good block breakpoint.

16. The non-transitory computer-readable storage medium of claim 9, wherein the processing device is further to:

determine that a second target block of a second memory operation being performed by a second memory division of the plurality of memory divisions does not include a retired portion, wherein the second memory operation is a same type of memory operation as the memory operation; and retrieve, in response to determining that the second target block does not include a retired portion, the full block power value, wherein the full block power value is less than the partially good block power value.

17. A system comprising:

a plurality of memory devices; and a processing device, operatively coupled with the plurality of memory devices, to:

determine that a portion of a target block of a memory operation being performed by a memory division of a plurality of memory divisions is retired;

retrieve, in response to determining that the portion is retired, a partially good block power value, wherein the partially good block power value differs from a full block power value;

receive, from the plurality of memory divisions, a plurality of power values;

determine a total power estimate for the plurality of memory divisions using the partially good block power value and the plurality of power values; and delay performance of a suboperation of the memory operation by the memory division in response to determining that the total power estimate satisfies a power threshold.

18. The system of claim 17, wherein the processing device is further to:

retrieve, in response to determining that the portion is retired, a second partially good block power value for a second suboperation of the memory operation, wherein the second partially good block power value is different from the partially good block power value.

19. The system of claim 17, wherein the processing device is further to:

receive, from a second memory division of the plurality of memory divisions, an updated power value;

determine an updated total power estimate for the plurality of memory divisions using the updated power value; and perform the suboperation of the memory operation by the memory division in response to determining that the updated total power estimate does not satisfy the power threshold.

20. The system of claim 17, wherein determining that the target block is a partial block further comprises:

determining a number of retired portions for the target block, wherein retrieving the partially good block power value uses the number of retired portions.

* * * * *